United States Patent [19]

Negroni et al.

[11] 4,213,753
[45] Jul. 22, 1980

[54] HONEYCOMB MUFFLE IN TANK FURNACES FOR GLASS MELTING

[76] Inventors: Eugenio Negroni; Roberto Negroni, both of Via De Rolandi 7, 20156 Milan, Italy

[21] Appl. No.: 892,876

[22] Filed: Mar. 31, 1978

[30] Foreign Application Priority Data

Apr. 7, 1977 [IT]  Italy ............................. 22264 A/77

[51] Int. Cl.² ............................................. F27D 1/00
[52] U.S. Cl. .................................... 432/247; 65/337; 65/346; 110/335; 110/338
[58] Field of Search ................ 432/247; 110/335, 338; 65/134, 136, 337, 346

[56] References Cited

U.S. PATENT DOCUMENTS

| | | | |
|---|---|---|---|
| 1,470,736 | 10/1923 | Himmelright | 110/338 |
| 1,477,811 | 12/1923 | Crawford | 110/335 |
| 1,962,738 | 6/1934 | Hahn et al. | 432/247 X |
| 2,263,848 | 11/1941 | Keaney | 432/247 X |

FOREIGN PATENT DOCUMENTS

767700 3/1953 Fed. Rep. of Germany ........... 432/247
735634 11/1932 France ...................................... 110/335

*Primary Examiner*—John J. Camby
*Attorney, Agent, or Firm*—Haseltine, Lake & Waters

[57]  ABSTRACT

Honeycomb muffle in tank furnaces for glass melting, comprising blocks of refractory material, characterized in that at least the crown of each furnace is made of blocks of refractory material, the free surface of which facing inwardly of the furnace is shaped with at least one recess defined by projecting ribs.

5 Claims, 9 Drawing Figures

HONEYCOMB MUFFLE IN TANK FURNACES FOR GLASS MELTING

This invention relates to a honeycomb muffle in tank furnaces for glass melting, and more particularly to a honeycomb muffle in superstructures of continuous tank furnaces for the melting of glass and its derivatives.

In glass melting furnaces, besides structural factors, a determining importance is to assigned to those thermal factors that have to take into account the calories required for bringing the cold mass or volume (glass junk and solid components for glass preparation) entering the furnace from the external temperature to the internal temperature of the furnace melting tank; the calories removed by the molten glass withdrawn from the furnace; the calories scattered by conduction from the furnace crown and walls (that is from the furnace piers); the calories scattered by conduction from the walls of the chambers of the recuperators or regenerators associated with the furnace; and the calories removed by the smokes to the stack.

It is also known that to have a glass with homogeneous composition and physical characterstics, the vitrifiable mixture in the furnace melting tank should be completely molten throughout the mass or volume, that is to say both at the surface and in depth or at the bottom close to the melting tank slab, which very seldom occurs in the present known type of furnaces.

The prior art superstructures of glass melting tank furnaces are made of blocks of refractory material, generally silica material, having smooth and uniform surfaces: thus, both the crowns and piers of the furnaces comprise smooth and continuous surfaces. Such a structure would result in a substantial heat want of the furnaces, such a want being a consequence of the reduced radiating surface of the crowns and piers of said furnaces.

In order to overcome the above mentioned disadvantages, an increasing consumption of thermic energy was resorted to, which generally developed in a consumption of fuel burnt inside the furnace by means of suitable burners. However, also in this case, satisfactory results could not be obtained, because of a very high temperature at the molten or melting mass or volume surface, and a similarly too low temperature within the mass or volume.

In order to increase the calories transferred to the melting mass or volume, it is a common practice to apply within the melting tank special electrodes of a considerable size, for example having a diameter of 36 mm and 2 meters long, the electrodes being immersed in the melting mass or volume to heat the same and accordingly increase the glass homogeneity and refining, with a heavy expense of electric energy and high cost of installation.

According to another commonly followed method, compressed air is blown in at a pressure of 2.0–2.5 atmospheres at the bottom of the melting tank, this air being effective to move the cold layers of the glass adjacent the bottom of the melting tank, imparting an upward movement thereto, thus contributing to an improved homogeneity and refining of the vitreous paste. However, the prior art furnaces are in any case not satisfactory because of requiring a high consumption of energy and not providing a glass having quite homogeneous composition and physical characteristics.

It is the primary object of the present invention to provide a honeycomb muffle in tank furnaces for glass melting, allowing to have a glass output per unitary surface area of melting tank larger than that of the prior art furnaces, and enabling to provide a saving of about 30% in fuel, still with respect to the known type of furnaces.

It is another object of the present invention to provide a muffle of the above mentioned type, enabling to maintain in the furnace a lower opertating temperature than in prior art furnaces, with less wear of the materials, a constant course of combustion in the furnace hearth, a reduced alkali etching on the walls outside of the furnace bath and a higher thermal yield than in the known type of furnaces and, as a highly important factor, allowing to obtain glass with quite homogeneous characteristics and enabling an extremely smooth operation of the entire system.

These and still further characteristics are accomplished by a muffle comprising blocks of refractory material, characterized in that at least the crown of each furnace is made of blocks of refractory material, the free surface of which facing inwardly of the furnace is shaped with at least one recess defined by projecting ribs.

In order that the structure and characteristics of the muffle for furnaces according to the present invention be more clearly understood, a preferred embodiment thereof will now be described by mere way of unrestrictive example with reference to the accompanying drawings, in which:

FIG. 8 is a schematic view of the profile of a furnace provided with a muffle according to the present invention; while

Figure 1:
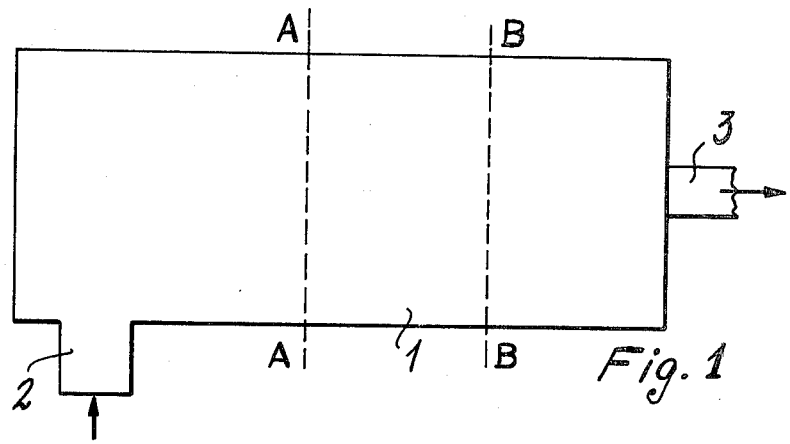
FIG. 1 is a schematic plan view showing the melting basin of a continuous tank furnace for glass melting.

In a furnace, the melting basin 1 of which has been schematically shown in a plan view in FIG. 1, the glass junk and composition comprised of the solid materials used for glass formation, that is the vitrifiable mixture, are supplied to furnace inlet zone 2, while the molten glass exits from a discharging door or mouth 3 to be fed to a rest tank and to be withdrawn therefrom for use.

Vertical piers 6 extend above said basin 1 as defined by a bottom 4 and side walls 5 and support the furnace crown 7.

While in the prior art furnaces, the surfaces facing inwardly of these furnace piers and crown are quite smooth and uniform, according to the present invention (FIGS. 2 and 3) they are honeycomb shaped, as clearly shown in the figures of the accomanying drawings.

Figure 4:
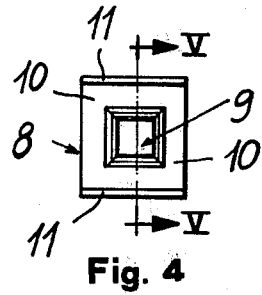
FIGS. 4 and 6 are front views showing two different embodiments of refractory material blocks for the construction of the furnace muffle.
Figure 5:
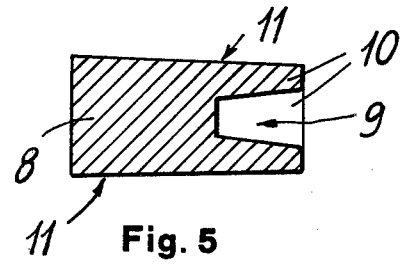
FIGS. 5 and 7 are cross-sectional views of the blocks shown in FIG. 4 and FIG. 6, respectively.

In order to provide such honeycomb muffles, blocks of refractory material are used, such as those shown in FIGS. 4 through 7. In FIGS. 4 and 5, there is shown a block of refractory material 8, the surface of which intended to face inwardly of the furnace is not smooth and uniform, but shaped with a recess 9 of square cross-section, defined by projecting ribs 10 which are made thin to the free ends thereof, so that the cross-section of recess 9 is increased from the bottom to the end surface of said block 8.

In the case shown in FIGS. 4 and 5, the two opposite sides 11 of block 8 are flat and inclined to each other with apex facing from the same side of the block as said recess 9. On approaching the inclined sides 11 of different blocks, the infrastructure of the furnace crown can be provided. Of course, the sides of block 8 could be two by two parallel to one another and this in order to provide for the infrastructure of the furnace piers.

Figure 6:
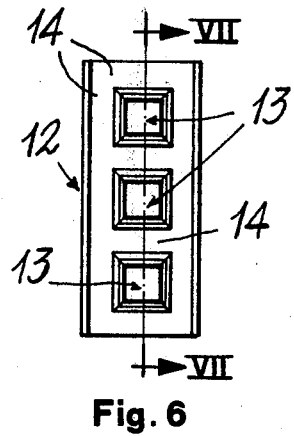
Figure 7:
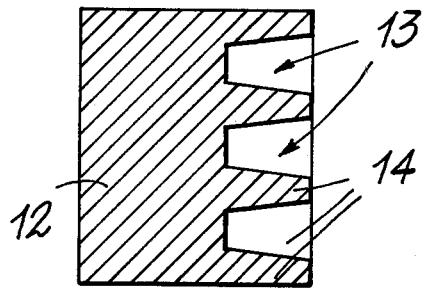

In FIGS. 6 and 7, there is shown a different embodiment of a block 12 of refractory material having a surface in which three different recesses 13 are provided and defined by ribs 14 quite similar to those of block 8 and of which no further explanations will accordingly be given.

As apparent, the blocks of refractory material with recesses and ribs could be made with any number of recesses in each of the blocks and instead of being of square cross-section, such recesses could be of a different section.

Figure 2:
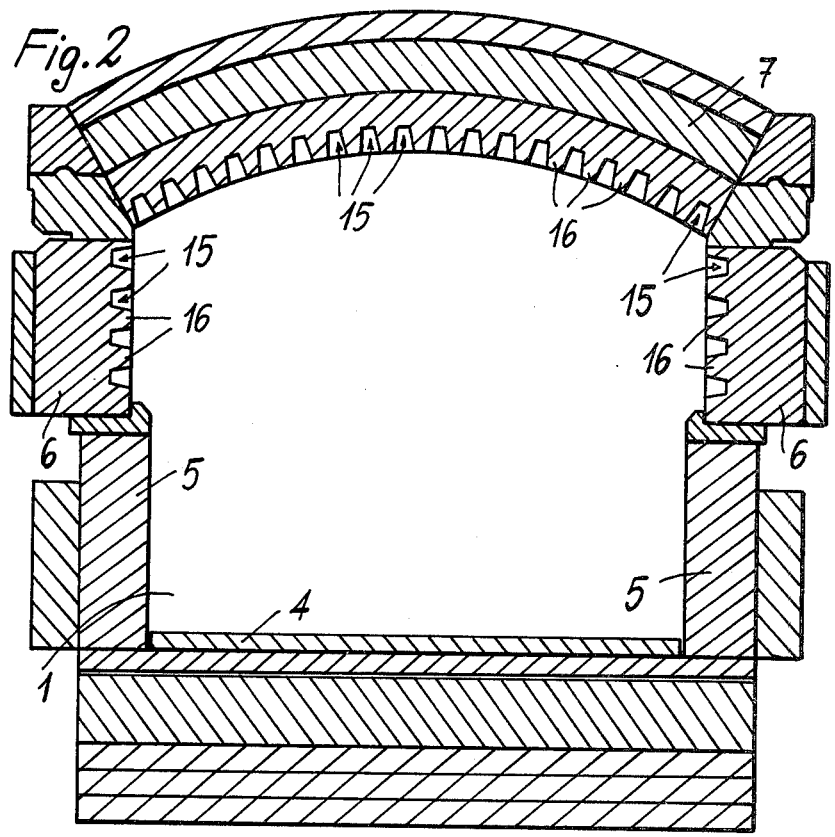
FIG. 2 is a vertical cross-sectional view of the furnace.
Figure 3:
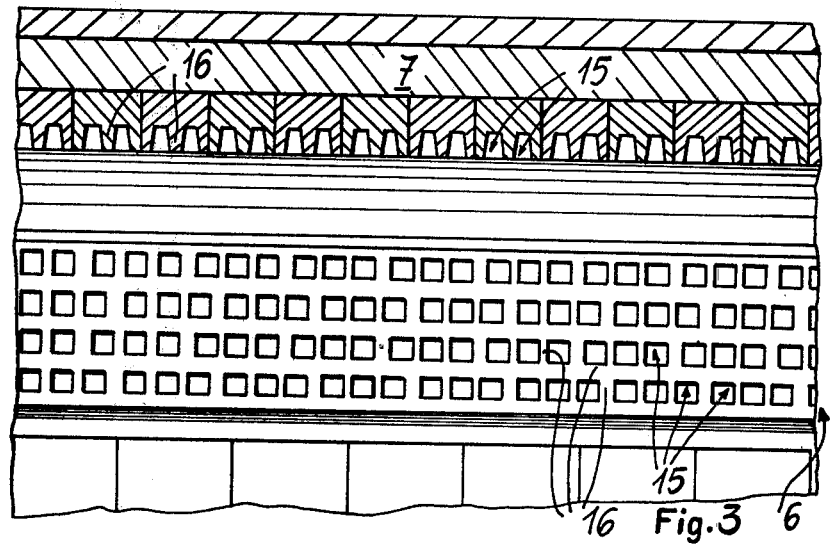
FIG. 3 is a fragmentary vertical longitudinal sectional view of the furnace.

In FIGS. 2 and 3, the blocks of refractory material comprising the furnace muffle have been merely outlined and, still for the sake of simplicity, the socket-shaped recesses in the various blocks have all been designated by reference numeral 15, whereas the ribs defining said recesses have been designated by reference numeral 16, both at the crown and piers.

Figure 8:
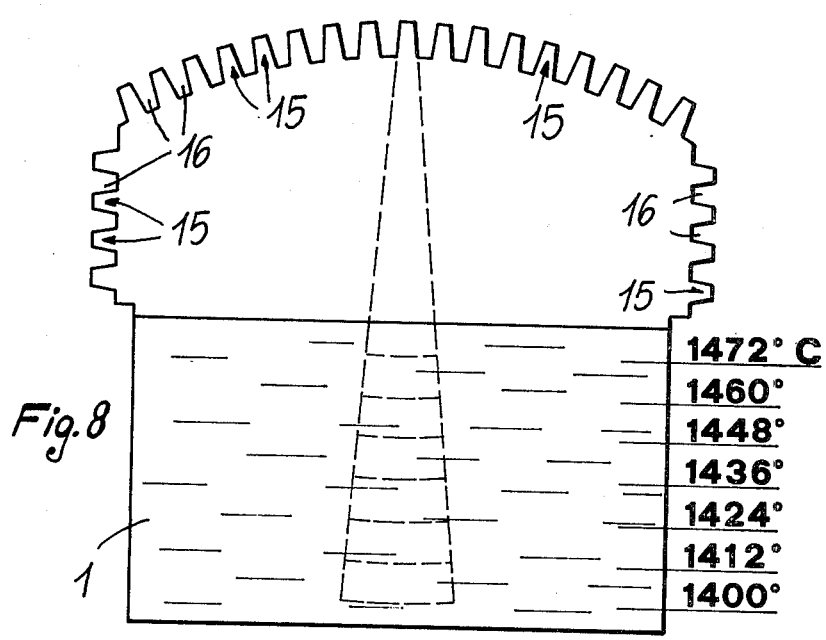
Figure 9:
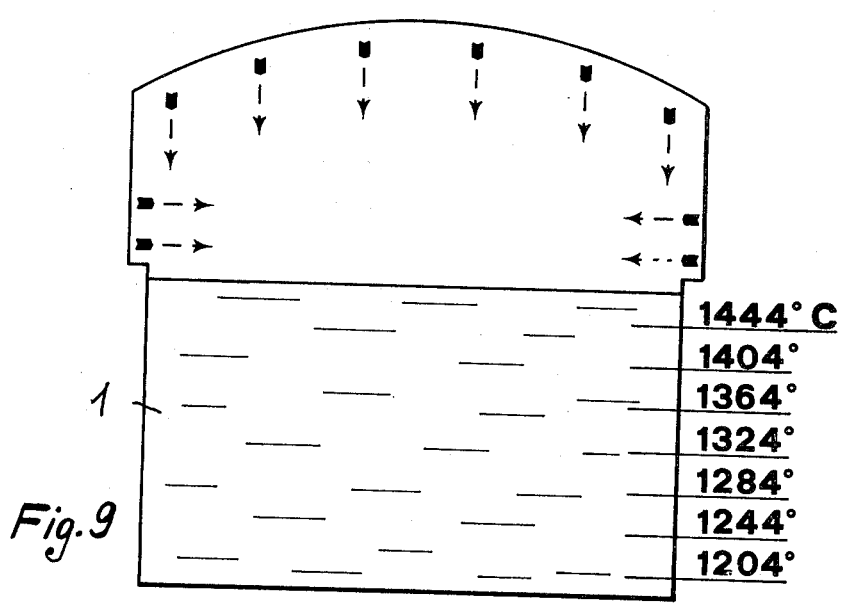
FIG. 9 is a schematic view of the profile of a furnace provided with a prior art muffle.

Referring now to FIG. 8, schematically showing the inner profile of a furnace muffle implemented with blocks according to the present invention, and to FIG. 9 which schematically shows the inner profile of a prior art furnace muffle. It will be readily appreciated that the radiating surface of the furnace muffle of FIG. 8 is by far superior to that of the furnace shown in FIG. 8. For example, should the radiating surface of the furnace shown in FIG. 9 have an area of 22 sq.m., under a same section for the melting basin or tank, the surface area for the furnace muffle shown in FIG. 8 would be of 60 sq.m. This enormous increase in radiating surface of the muffle and that said recesses behave as beacons concentrating in beams (one of which has been shown by dotted lines in FIG. 8) the thermic energy irradiated by the muffle, provide a considerable temperature differential on the various of the glass bath in a furnace made with a muffle according to the invention relative to a convention furnace.

Thus, assuming that in both cases (FIGS. 8 and 9) a temperature of 1484°C. (about 2700° F.) is desired at the surface of the glass bath, whereas in the latter having a height of 1.20 m the temperatures at constant spacings or levels are as those shown on the drawing of FIG. 9 (with a minimum temperature of 1204°, or about 2200° F., adjacent the basin or tank bottom), where the muffle is made with blocks according to the present invention, in the mass or volume of glass bath and at the same spacings or levels as above, the temperatures will be those as shown in FIG. 8, with a minimum temperature adjacent the basin or tank bottom of 1400° C. (about 2550° F.), which means a temperature of 196° C. (about 385° F.) higher than that at the same location with a conventional type of muffle.

It is important to consider that a muffle according to the present invention, as hitherto described, represent the furnace hearth, which is the actual heart or center of the system, since the whole combustion apparatus is accommodated therein, the arrival of the preheated air from the turrets of the recuperators or regenerators, the outlet of smokes, and the drive and control apparatus for the entire system.

Referring again to the tank furnace for glass melting and refining as outlined in FIG. 1, the course of the vitreous masses or volumes moving from furnace inlet 2 to discharging door or mouth 3 is such that in a furnace having a conventional muffle no further floating masses would be present on the glass bath at dotted line B—B, while with a muffle according to the present invention such solid floating masses would no longer exist just at the dotted line A—A.

This means that with a muffle according to the present invention a very smooth course of the furnace is obtained, the vitrifiable mixture being throughly molten at a very remote location from said discharging door or mouth 3.

The fact that, under the same dimension conditions of the furnace, a muffle according to the invention enables to melt the vitrifiable mixture in a much shorter time than with the use of conventional muffles, allows to maintain in such a furnace a perfectly molten vitrous mass or volume for a longer period of time, which not only greatly affects an increase in production as a function of a more rapid glass melting and refining process, but also enables to provide a glass having perfectly homogeneous and repeatable composition and physical characteristics.

From the foregoing and since a lower temperature can be maintained above the free surface of the molten or melting vitreous mass than required in conventional type of furnaces, the furnaces having a muffle according to the invention enable a saving of about 30% fuel with respect to conventional furnaces (particularly due to the large radiating surface of the furnace muffle substantially increasing the thermic damper, substantially annulling the cooling phenomenon caused by the entrance of cold material at the charging inlet 2), a higher glass output for unitary (sq.m.) surface area of the melting basin or tank (due to a more uniform temperature in the furnace hearth accelerating the refining process of the vitrifiable mixture), allow to maintain a lower operating temperature and to have a lower wear of materials, to maintain a constant course of combustion in the furnace hearth, to provide a higher thermic yield and an increased smooth operation in the entire system, and to have a reduced corrosive etching on the walls outside the furnace bath, than in furnaces provided with a known type of muffle.

Of course, the blocks of refractory material used for implementing the above described muffle can be made with the best suited refractory materials for the intended use; for example, such materials could be made of silica, alumina, silicon carbide, zirconium and silica, magnesite and chromite, etc.

It is also apparent that glass and its derivatives can be melted in the above described furnace for the production of hollow glass, pressed glass, stretched or building glass and agglomerates thereof at present in use in glass industry.

What we claim is:
1. A honeycomb muffle in a tank surface, having a crown, piers and an inner free surface, for glass melting, comprising blocks of refractory material, wherein at least the crown of said furnace is made of blocks of refractory material, the free surface of which facing inwardly of the furnace is shaped with at least one re- cess defined by inwardly narrowing projecting ribs, resulting in said recess having a square shape in cross section with regard to the face of the free surface and a trapezoidal cross section with regard to the width of said free surface.

2. A muffle according to claim 1, wherein said ribs are made thin to the free ends thereof.

3. A muffle according to claim 1, wherein the two opposite sides of said blocks are flat and inclined to each other with the apex facing from the same side of the block as said recess.

4. A muffle according to claim 1, wherein the furnace piers are made of blocks of refractory material similar to those comprising the furnace crown.

5. Blocks of refractory material for the construction of tank muffle furnace muffles for glass melting wherein one surface of said blocks is shaped with at least one recess defined by inwardly narrowing projecting ribs, resulting in said recess having a square shape in cross-section with regard to the face of said surface, and trapezoidal in cross-section with regard to the width of said surface.

* * * * *